Patented June 7, 1949

2,472,433

UNITED STATES PATENT OFFICE 2,472,433

BIOTIN INTERMEDIATE

Marjorie B. Moore and Edmond E. Moore, Waukegan, Ill., assignors to Abbott Laboratories, a corporation of Illinois No Drawing. Application April 7, 1943,
Serial No. 482,206

5 Claims. (Cl. 260—329)

The present invention relates to products of interest in the therapeutic field and improved processes of preparing the same. More specifically, the present invention is directed to the synthesis of intermediates for use in the preparation of certain vitamins or vitamin-like substances such as Biotin of the vitamin B-complex.

The principal object of the present invention is to provide products for use in the preparation of therapeutically active compounds, including compounds used in vitamin therapy.

Another object of the present invention is to provide improved processes of preparing products for use in the preparation of therapeutically active compounds.

Other objects of the present invention will be apparent as the detailed description hereinafter proceeds.

The products of the present invention include 2 - carbalkoxy - 3 - oxo - tetrahydrothiophenes. These products may be prepared by reacting the β-(carbalkoxymethylthio) propionic esters described in our co-pending application, Serial No. 482,205, filed April 7, 1943, now abandoned, with alkali metals or with sodium ethylate, sodium triphenyl methyl, potassium tertiary butoxide or other Claisen type condensation agents made up of an alkali metal-weakly acidic radical. Examples of other suitable weakly acidic groups are —NH₂, —OR where R is a lower alkyl group such as methyl, isopropyl, tertiary butyl, etc. The products of the present invention also include carbalkoxy - oxo - acylamino - tetrahydrothiophenes. These products may be prepared as above by condensing a β-(carbalkoxymethylthio) propionic acid ester having one hydrogen atom on the carbon atom α to one carbalkoxy group replaced by an acylated amino group. The acylamino intermediates are also described in our above mentioned application and their use is generally preferred as they provide means for controlling the position at which alcohol is split out to form the cyclic β-keto ester. The following formulas will serve to illustrate the reactions in this process.

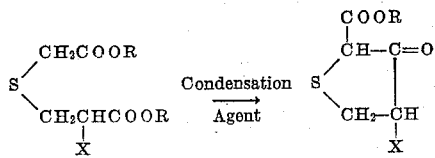

where the R's represent lower alkyl groups, and X is hydrogen or an acylamino group, e. g.

NHCOR" where R" represents an alkyl or aryl or aralkyl group.

The following example will serve to illustrate the preparation of the β-(carbalkoxymethylthio) propionic acid esters for use in the present invention:

EXAMPLE I

*Ethyl ester of β-(carbethoxymethylthio) propionic acid*

A mixture made up of about 22 grams of thioglycollic acid, 45 grams of ethylacrylate and 0.5 gram of pyridine is first heated in a closed vessel at about 100° C. for about eight hours. The excess ethylacrylate along with the pyridine are then removed by distillation.

The half ester obtained is converted into the diester by saturating an absolute alcohol solution of the half ester with HCl gas. The reaction mixture is next neutralized with alkali (e. g. sodium carbonate), and the crude product obtained by the above reactions purified by fractional distillation under reduced pressure. The desired diethyl ester boils at about 136°–138° C. at 8 mm. pressure.

The diesters may also be obtained by reacting thioglycollic acid or a lower alkyl thioglycollate with acrylonitrile, with subsequent hydrolysis of the resulting propionitrile in accordance with standard practices. The esterification may be carried out by use of the desired lower alcohol (e. g. methyl, propyl, butyl, etc.), in the presence of an acidic catalyst as outlined above.

The acylamino derivatives for use in the present invention may be prepared by reacting β-(carboxymethylthio) α - aminopropionic acid with the desired acid halide such as acetyl chloride, butyryl bromide, benzoyl chloride, naphthoyl bromide, phenyl acetyl chloride, etc. The use of aromatic acid halides is generally preferred, due to ease of preparation of the acylamino compounds and freedom from side reactions. The following example will serve to illustrate the preparation of the β-(carbalkoxymethylthio) α-(acylaminopropionic acid esters for use in the present invention.

EXAMPLE 2

*Ethyl ester of β-(carbethoxymethylthio) α-N-benzoylaminopropionic acid*

To an aqueous solution containing about one mol of β-(carboxymethylthio) α-aminopropionic acid is first added about five molar proportions of sodium hydroxide. The solution is next cooled and about 1.5 molar proportions of benzoyl chloride added with stirring, the stirring being continued until the odor of the acid chloride has disappeared. About 5.5 molar proportions of concentrated hydrochloric acid are next added and the crude precipitate obtained, dried, and then esterified by suspending in absolute alcohol and passing in dry hydrogen chloride. After saturation, the alcohol and HCl are next removed by vacuum distillation, the residue taken up in ether, washed with aqueous sodium carbonate, and the ether solution dried over anhydrous sodium sulfate. The ether is then evaporated and the residue freed from ethyl benzoate and other volatile impurities by distilling at about 5 mm. pressure at a bath temperature not exceeding 140° C. The liquid residue remaining, contains the desired diester and while it cannot be distilled without decomposition, it is suitable in its crude form for use in the preparation of the $\beta$-keto esters described hereinafter.

The following examples will serve to illustrate the preparation of the tetrahydrothiophenes of the present invention.

EXAMPLE 3

*Carbethoxy-3-oxo-tetrahydrothiophenes*

About 12 grams of alcohol free sodium ethylate in 80 cc. of dry ether is first added to a flask (equipped with a mechanical stirrer and drying tube), cooled in an ice bath. To this mixture is added with stirring about 19.4 grams of the ethyl ester of $\beta$-(carbethoxymethylthio) propionic acid, and the reaction mixture stirred over night, during which time, the mixture rises to room temperature. The reaction mixture is next poured into a mixture of about 16 grams of acetic acid in ice. The reaction mixture is then extracted with five 50 cc. portions of 5 per cent potassium hydroxide solution, and the extracts poured at once into an ice mixture containing a slight excess of acetic acid. The resulting mixture is next extracted with carbon tetrachloride and the resulting extract shaken with saturated sodium carbonate solution to remove acid. The carbon tetrachloride solution is dried over anhydrous sodium sulfate, the solvent removed by distillation and the crude product remaining purified by distillation under reduced pressure. The carbethoxyoxo-tetrahydrothiophene composition obtained boils at about 104–110° C. at 2 mm. pressure and may be represented by the following formula:

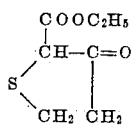

The composition containing the desired 2-derivative illustrated in the above formula may also contain some of the 4-derivative, but may be used as such in its crude form in the synthesis of therapeutic products. The ethyl groups may be replaced by other lower alkyl groups by the use of the proper carboxymethylthiopropionic acid esters.

EXAMPLE 4

*2-carbethoxy-3-oxo-4-benzoylamino-tetrahydrothiophene*

This product may be prepared in accordance with the general process of Example 3 as follows: A suspension of sodium ethylate in dry ether or like organic solvent is first prepared from powdered sodium and the equivalent amount of absolute ethyl alcohol. To this suspension contained in a flask equipped with a mechanical stirrer and reflux condenser with a drying tube and surrounded by an ice bath, is added a solution in ether of a half mole (with reference to sodium used) of the ethyl ester of $\beta$-(carbethoxymethylthio) $\alpha$-N-benzoylamino propionic acid. The mixture is stirred and cooled with ice for about three hours and then allowed to stand over night at room temperature. The reaction mixture is next poured into a mixture of ice containing slightly over one molecular equivalent of acid such as acetic acid. The ether layer is separated—more ether being added if necessary to dissolve all of the product. The $\beta$-keto ester contained in the ether is then shaken out by the use of slightly more than one molecular equivalent of 5 per cent aqueous alkali (KOH) solution in six decreasing portions. Each alkaline solution, as soon as it is separated, is run into a previously prepared mixture of ice containing a slight excess over one molecular proportion of acid such as acetic acid.

The sticky precipitate obtained is next taken up in a solvent such as ether, the resulting solution washed with sodium bicarbonate solution and the solvent layer dried over anhydrous sodium sulfate. As the enol form of this product is liquid, the dry solution is preferably allowed to stand for several days in order to insure the complete conversion of any enol product present to the desired solid keto form. The solvent is then removed by distillation in vacuo, and the resulting crystalline residue washed with ether and dried in a vacuum desiccator. The desired product which is in crystal form and melts at about 86°–87° C., may be represented by the following formula:

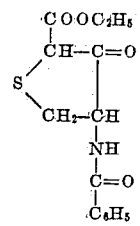

EXAMPLE 5

*2-carbethoxy-3-oxo-4-benzoylamino-tetrahydrothiophene*

Crude ethyl ester of $\beta$-(carbethoxymethylthio) $\alpha$-N-benzoylaminopropionic acid is treated with about two molecular equivalents of triphenylmethyl sodium in dry ether. The product may be worked up as in Example 4, or the $\beta$-keto ester may be precipitated from the dry ether solution with dry ammonia gas. The ammonia addition compound which is precipitated is unstable and loses ammonia even on drying in a vacuum desiccator.

The condensation may also be carried out with NaNH₂ or KNH₂ or with alkali metal methylates, isopropylates, tertiary butylates, etc., in accordance with the general processes outlined above. The length of time required for completion of the reaction varies somewhat with different starting materials but the optimum times and conditions may be readily ascertained by preliminary laboratory tests.

The tetrahydrothiophene products of the present invention react with halogen substituted fatty acid esters, (e. g. chlorine and bromine derivatives of butyric, caproic, lauric, etc. acids), to form important intermediates for use in the synthesis of therapeutically active compounds. These reactions may be illustrated by the following formulas:

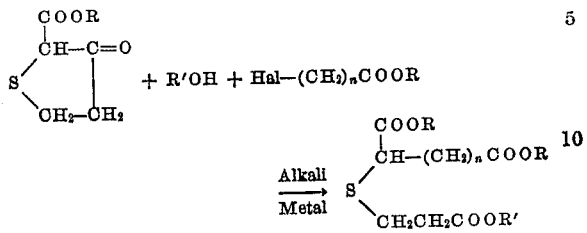

where R and R' represent lower alkyl groups, $n$ represents a whole number, e. g. 3–15, and Hal represents a halogen atom such as bromine, chlorine, etc. The following example will serve for illustrative purposes.

EXAMPLE 6

*Ethyl - ε-carbethoxy - ε-(β'-carbethoxyethylthio) n-hexoate*

To about 2.3 grams of sodium dissolved in 50 cc. of absolute alcohol is added about 17.4 grams of 2-carbethoxy-3-oxo-tetrahydrothiophene and the mixture refluxed for about five minutes and then allowed to stand for about one-half hour. The mixture is again heated to refluxing temperature and about 23.1 grams of ethyl delta brom valerate added dropwise, at the end of which the complete mixture is refluxed for about eight hours. At the end of this period the mixture which is about neutral, is cooled in an ice bath and the supernatant liquid decanted from the solid sodium bromide. The alcohol is then distilled and the residue fractionally distilled under reduced pressure. The final product which boils at about 140°–150° C. at 2 mm. pressure may be represented by the following formula:

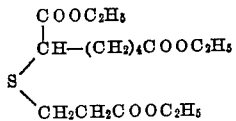

The compounds of the type illustrated under Example 6 may also be condensed with Claisen type (alkali metal) cyclization agents. The resulting cyclic products are important intermediates for use in the synthesis of therapeutically active compounds.

It will be understood that the present invention is not limited to the above illustrative examples. All modifications of the present invention are intended to be covered by the following claims.

We claim:

1. A tetrahydrothiophene compound represented by the following formula:

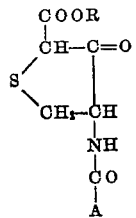

where the R is a lower alkyl group and A is selected from the group consisting of alkyl, aralkyl and aryl groups.

2. The compound represented by the formula of claim 1 where A is a phenyl group.

3. A compound represented by the following formula:

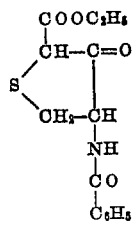

4. In the process of preparing an N-acylamino cyclic β-keto ester, the step which consists in the intramolecular condensation of a β-(carbalkoxymethylthio) α-acylamino propionate in the presence of an alkali metal condensation agent.

5. The process of preparing a carbalkoxy-3-oxo-4-benzoylamino-tetrahydrothiophene which comprises condensing a di-lower alkyl ester of a β-(carboxymethylthio) α-N-benzoylamino propionic acid in the presence of an alkali metal condensation agent and dry organic solvent reaction medium, neutralizing the reaction mixture by addition of acid, extracting the organic solvent layer with aqueous alkali, acidifying the alkaline extract, dissolving the β-keto ester precipitate obtained in an organic solvent, drying the resulting solution, and removing the solvent by distillation at a temperature below the decomposition temperature of the carbalkoxy-3-oxo-4-benzoylamino-tetrahydrothiophene residue.

MARJORIE B. MOORE.
EDMOND E. MOORE.

REFERENCES CITED

The following references are of record in the file of this patent:

UNITED STATES PATENTS

| Number | Name | Date |
| --- | --- | --- |
| 2,101,560 | Ralston | Dec. 7, 1937 |
| 2,262,686 | Kyrides | Nov. 11, 1941 |